(12) United States Patent
Betzold

(10) Patent No.: US 8,352,381 B2
(45) Date of Patent: Jan. 8, 2013

(54) SYSTEM AND METHOD FOR REIMBURSEMENT OF TUITION EXPENSES

(75) Inventor: Mary Jo Betzold, Savage, MN (US)

(73) Assignee: tuitionXpress, Inc., Savage, MN (US)

( * ) Notice: Subject to any disclaimer, the term of this patent is extended or adjusted under 35 U.S.C. 154(b) by 549 days.

(21) Appl. No.: 12/492,811

(22) Filed: Jun. 26, 2009

(65) Prior Publication Data

US 2010/0332279 A1    Dec. 30, 2010

(51) Int. Cl.
*G06Q 30/00* (2012.01)
(52) U.S. Cl. ...................................................... 705/322
(58) Field of Classification Search .................... 705/322
See application file for complete search history.

(56) References Cited

U.S. PATENT DOCUMENTS

| | | | | |
|---|---|---|---|---|
| 2003/0088487 | A1* | 5/2003 | Cheng et al. | 705/30 |
| 2003/0208719 | A1* | 11/2003 | Fay, Jr. | 715/507 |
| 2008/0040149 | A1* | 2/2008 | Joao | 705/1 |
| 2008/0294467 | A1* | 11/2008 | Grundy | 705/4 |

OTHER PUBLICATIONS

PR Newswire "MSNBC Intranet Goes Live with edcor's New Tuition Administrator Program" Jan. 29, 2011. p. 1.*
"Complaint against Tuition Express, Inc.", *Edcor Data Services* vs. *Tuition Xpress, inc.*, United States District Court, Eastern District of Michigan, Southern Division, Case No. 2:11-cv-13509-BAF-LJM, (Aug. 11, 2011), 10 pgs.
"About EdAssist", EdAssist, [Online]. Retrieved from the Internet: <URL: http://www.edassist.com/pages/aboutedassist.html>, (Sep. 28, 2007), 1 pg.
"Application for Academic Program Approval—Form 15-15A", Caltech Tuition Reimbursement Plan, (Jan. 1, 2003), 1 pg.
"Application for Tuition Assistance NAVMC 10883 (Rev. 6-97)(EF)", SN: 0109-LF-0690000, 2 pgs.
"College Solutions", EdAssist, [Online]. Retrieved from the Internet: <URL: http://www.edassist.com/pages/suppliersolutions.html>, (Mar. 5, 2009), 2 pgs.
"EdAssist Implementation Process", EdAssist, [Online]. Retrieved from the Internet: <URL: http://www.edassist.com/pages/rfi/implementation.htm>, (Mar. 5, 2009), 1 pg.
"EdAssist Management", EdAssist, [Online]. Retrieved from the Internet: <URL: http://www.edassist.com/pages/executiveteam.html>, (Mar. 5, 2009), 1 pg.
"EdAssist Systems and Security", EdAssist, [Online]. Retrieved from the Internet: <URL: http://www.edassist.com/pages/rfi/systems.htm>, (Mar. 5, 2009), 2 pgs.

(Continued)

*Primary Examiner* — John Hayes
*Assistant Examiner* — Allen J Jung
(74) *Attorney, Agent, or Firm* — Schwegman Lundberg & Woessner, P.A.

(57) ABSTRACT

A system for tuition reimbursement includes an administrative command module. An administrator can use the command module to implement a plurality of features on the system. After system set up by the administrator, a user interface displays an electronic application form for requesting reimbursement for tuition expenses. A completed electronic application form is transmitted to a manager for approval to take the course and a human resources administrator. Data relating to a completion of an education course is received, and then this data is transmitted to the manager of an employee and the human resources administrator. Input is then received relating to an approval or a denial of payment for the reimbursement for tuition expenses.

15 Claims, 12 Drawing Sheets

OTHER PUBLICATIONS

"EdAssist Technical Architecture", EdAssist, [Online]. Retrieved from the Internet: <URL: http://www.edassist.com/pages/rfi/technicalarchitecture.htm>, (Mar. 5, 2009), 2 pgs.

"Edcor Announces Expanded Service Offering, Updating its Service Portfolio With Two Value-Added Services Designed to Assist Companies With Managing the Administration of Tuition Assistance, Learning and Other Specialized Benefits Programs", PR Newswire, [Online]. Retrieved from the Internet: <URL: http://www.prnewswire.com/news_releases/54080957.html>, (Feb. 2004), 4 pgs.

"First Data's Domestic Tuition Reimbursement Policy", (Feb. 2009), 4 pgs.

"Freqently Asked Questions: Getting Started", EdAssist, [Online]. Retrieved from the Internet: <URL: http://www.myedassist.com/faqs.html>, (Mar. 12, 2009), 1 pg.

"Frequently Asked Questions: Application/Request for Degree Program Application", EdAssist, [Online]. Retrieved from the Internet: <URL: http://www.myedassist.com/faqs_pos.html>, (Mar. 12, 2009), 1 pg.

"How Can Your Company Save Money Through EdAssist", EdAssist, [Online]. Retrieved from the Internet: <URL: http://www.edassist.com/pages/costcalculator.html>, (Sep. 28, 2007), 1 pg.

"Managed Education", EdAssist, [Online]. Retrieved from the Internet: <URL: http://www.edassist.com/>, (Mar. 5, 2009), 1 pgs.

"MyEdAssist Platform as a Service", EdAssist, [Online]. Retrieved from the Internet: <URL: http://www.edassist.com/software.html>, (Mar. 5, 2009), 1 pg.

"Reporting", EdAssist, [Online]. Retrieved from the Internet: <URL: reporting.html>, (Mar. 5, 2009), 1 pg.

"Reports page", EdAssist, [Online]. Retrieved from the Internet: <URL: http://www.edassist.com/new/graphics/reports.gif>, (Sep. 28, 2007), 1 pg.

"Request for Information", EdAssist, [Online]. Retrieved from the Internet: <URL: http://www.edassist.com/pages/Rfi.asp>, (Sep. 28, 2007), 1 pg.

"SLAC Tuition Reimbursement Form", SLAC-TRP Form, (Nov. 23, 2005), 2 pgs.

"Software Pricing", EdAssist, [Online]. Retrieved from the Internet: <URL: http://www.edassist.com/pages/softwarepricing>, (Mar. 5, 2009), 1 pg.

"Tax Code", EdAssist, [Online]. Retrieved from the Internet: <URL: http://www.edassist.com/pages/counseling/taxcode.html>, (Mar. 5, 2009), 1 pg.

"Taxable Tuition Reimbursement Notice".

"The EdAssist Software as a Service Architecture", EdAssist, [Online]. Retrieved from the Internet: <URL: http://www.edassist.com/pages/rfi/saas.htm>, (Jun. 5, 2009), 1 pg.

"Tuition Administration Software", EdAssist, [Online]. Retrieved from the Internet: <URL: http://www.edassist.com/pages/software.html>, (Sep. 28, 2007), 1 pg.

"Tuition Assistance Administration", EdAssist, [Online]. Retrieved from the Internet: <URL: http://www.edassist.com/pages/employerservices.html>, (Mar. 5, 2009), 1 pg.

"Tuition Reimbursement: Instructions and Application for Receiving Tuition Reimbursement", South Harrison Community School Corporation, (Jan. 2008), 2 pgs.

"We Are Ready to Help", EdAssist, [Online]. Retrieved from the Internet: <URL: http://www.edassist.com/pages/planadvisor.asp>, (Mar. 5, 2009), 1 pg.

"Welcome to MyEdAssist", EdAssist, [Online]. Retrieved from the Internet: <URL: http://www.myedassist.com/default.asp>, (Mar. 12, 2009), 1 pgs.

"Welcome to MyEdAssist", EdAssist, [Online]. Retrieved from the Internet: <URL: http://www.myedassist.com>, (Sep. 28, 2007), 1 pg.

"Workflow", EdAssist, [Online]. Retrieved from the Internet: <URL: http://www.edassist.com/pages/workflow.html>, (Sep. 28, 2007), 1 pg.

* cited by examiner

| 1. INSTRUCTIONS | 2. COURSES AND FACILITY | 3. APPROVERS | 4. SUBMIT |

COMPLETE THE FOLLOWING INFORMATION REGARDING YOUR REQUEST FOR TUITION REIMBURSEMENTS.

* INDICATES REQUIRED FIELD

EDUCATION TYPE *  [MAKE A SELECTION ▽]

FIELD STUDY *  [           ]  (MAJOR SEARCH)

FACILITY *  [           ]  (FACILITY SEARCH)

COMPLETION DATE *  [  /  /  ]  (MM/DD/YYYY)

START DATE *  [  /  /  ]  (MM/DD/YYYY)

END DATE *  [  /  /  ]  (MM/DD/YYYY)

| COURSE NUMBER * | COURSE NAME * | ESTIMATED TUITION* | MODE OF DELIVERY | ESTIMATED TUITION* | FEES | BOOKS | PREPAID AMOUNT | FINANCIAL AID |
|---|---|---|---|---|---|---|---|---|
| [ ] | [ ] | [ ] | [SELECT ▽] | $[ ] | [ ] | [ ] | [ ] | [ ] |
| [ ] | [ ] | [ ] | [SELECT ▽] | $[ ] | [ ] | [ ] | [ ] | [ ] |
| [ ] | [ ] | [ ] | [SELECT ▽] | $[ ] | [ ] | [ ] | [ ] | [ ] |

ADD ANOTHER COURSE (NEXT ▷)

*FIG. 3*

MANAGE APPLICATION & CUSTOMIZE SITE

FOR PROGRAM ADMINISTRATOR USE ONLY.

510 — USERS
- 511 — EMPLOYEE SEARCH ▷
- 512 — EMPLOYEE ACCOUNT ▷
- 513 — MANAGE USERS ▷
- 514 — MANAGE USER GROUPS ▷
- 515 — SITE PERMISSIONS ▷

520 — APPLICATIONS
- 521 — APPLICATION OVERRIDE ▷
- 522 — REIMBURSEMENT APPROVAL ▷

530 — REPORTS / LOGS
- 531 — EMAIL STATISTICS ▷
- 532 — SUMMARY BY MONTH ▷
- 533 — SUMMARY BY DEPARTMENT ▷
- 534 — SUMMARY BY ENTIRE ORGANIZATION ▷
- 535 — SUMMARY BY FIELD OF STUDY ▷
- 536 — SUMMARY BY BUSINESS UNIT ▷
- 537 — SUMMARY BY FACILITY ▷
- 538 — SUMMARY BY ELIGIBLE vs. PARTICIPATING ▷
- 539 — SUMMARY BY PARTICIPATION ▷
- 540 — SUMMARY BY APPLIED FOR vs. PAID OUT ▷
- 541 — TURNOVER REPORT ▷

550 — CONTENT
- 551 — UPDATE FACILITIES ▷
- 552 — UPDATE MAJORS ▷
- 553 — MANAGE DEGREE TYPES ▷
- 554 — MANAGE INSTRUCTIONS ▷
- 555 — MANAGE REASONS FOR DENIAL ▷
- 556 — MODIFY TAX QUESTION LANGUAGE ▷
- 557 — EMPLOYEE AGREEMENT ▷
- 558 — CONTACT INFORMATION ▷
- 559 — UPDATE ABOUT THE PROGRAM ▷
- 560 — MANAGE EMAILS ▷
- 561 — MODIFY HOVERING QUICKTIPS ▷
- 562 — MANAGE FAQs ▷

570 — SYSTEM
- 571 — GENERAL SETTINGS ▷
- 572 — WEBSITE STYLE ▷

580 — DATA FEEDS
- 581 — TX OUT FILE ▷
- 582 — DEMOGRAPHICS IMPORT FILE ▷
- 583 — HISTORY IMPORT FILE ▷

*FIG. 5*

| | SYSTEM SETTINGS | |
|---|---|---|
| 610 | | ←600 |
| 611 | LOCKED ACCOUNTS WILL AUTOMATICALLY BE LOCKED AFTER X HOURS: | 1 ▽ |
| 612 | CURRENCY | United States of America, Dollars (USD) ▽ |
| 613 | COMPANY NAME | tuitionXpress |
| 614 | NUMBER OF "NO" ANSWERS FOR TAXABLE STATUS | 1 ▽ |
| 615 | DOES IT NEED TO SHOW TAX QUESTIONS? | ☑ |
| 616 | DOES IT NEED TO SHOW FEES? | ☑ |
| 617 | DOES IT NEED TO SHOW BOOKS? | ☑ |
| 618 | SYSTEM NAME FOR EMAIL | tuitionXpress system |
| 619 | SYSTEM EMAIL | ksusha@ds6.net |
| 620 | SITE URL | http://tuitionXpress.com/ |
| 621 | ALLOW TEXT FIELD FOR DENIAL REASON | ☑ |
| 622 | TAKING COURSES P/F IS ACCEPTABLE | ☑ |
| 623 | GRADE SYSTEM THRESHOLD | C- ▽ |
| 624 | EDITOR DOCUMENTATION LINK | http://docs.fckeditor.net/ |
| 625 | AUTOMATIC ACTION AFTER | 3 ▽ days  approve ▽ |
| 626 | EXPIRATION TIME FOR 'FORGOT PASSWORD' LINK (IN HOURS) | 48 ▽ |
| 627 | DOES IT NEED TO SHOW PREPAID AMOUNT? | ☑ |
| 628 | FAX NUMBER OF ALL APPLICATION SUPPORTING DOCUMENTATION | 800-222-3333 |
| 629 | SETUP BUDGET YEAR | January ▽ |
| 630 | USERS CAN APPLY FOR UP TO | 20 ▽ classes within  1  days |
| 631 | LINK TO GOVERNMENT TAX PAGE | http://www.irs.gov/public |
| 632 | NEED TO RECEIVE PAPERWORK BEFORE 90 DAYS POST FIRST TERM END DATE | 90 |
| 633 | CAN ONLY SUBMIT AN APPLICATION WITH TWO SEPARATE FACILITIES ONLY IF TERM END DATES ARE LESS THAN 30 DAYS APART | 30 |
| 634 | USERS SHOULD NOT BE ABLE TO EDIT APPLICATION OR GRADES AFTER GRADES HAVE BEEN SUBMITTED THE FIRST TIME | ☑ |
| 635 | USERS CAN APPLY FOR UP TO | 20 ▽ applications within  30  days |
| 636 | LINE ITEMS PER PAGE | 25 |
| 637 | USE COURSE START DATE FOR BUDGET CALCULATIONS | ☑ |
| 638 | SHOW ASK A QUESTION LINK IN FAQ SECTION | ☑ |

*FIG. 6*

SYSTEM AND METHOD FOR REIMBURSEMENT OF TUITION EXPENSES

TECHNICAL FIELD

The present disclosure relates to a system and method for the reimbursement of tuition expenses.

BACKGROUND

Many business organizations, especially larger corporate entities, offer their employees tuition benefits. Such benefits normally include the reimbursement of tuition, books, and other related expenses for job-oriented or other approved courses. However, since tuition benefits and reimbursement are not the primary business of these business organizations, the entire process is manual, paper intensive, and less than efficient.

The approaches described in this background section could be pursued, but are not necessarily approaches that have been previously conceived or pursued. Therefore, unless otherwise indicated herein, the approaches described in this background section are not prior art to the claims in this application and are not admitted to be prior art by inclusion in this background section.

BRIEF DESCRIPTION OF THE FIGURES

FIG. 3 is an example embodiment of an employee user interface for a system for reimbursement of tuition expenses.

FIG. 5 is an example embodiment of a system administrator user interface for managing a system for reimbursement of tuition expenses and customizing a website for reimbursement of tuition expenses.

FIG. 6 is an example embodiment of a system administrator user interface for establishing system settings for a system for reimbursement of tuition expenses.

DETAILED DESCRIPTION

Figure 1:
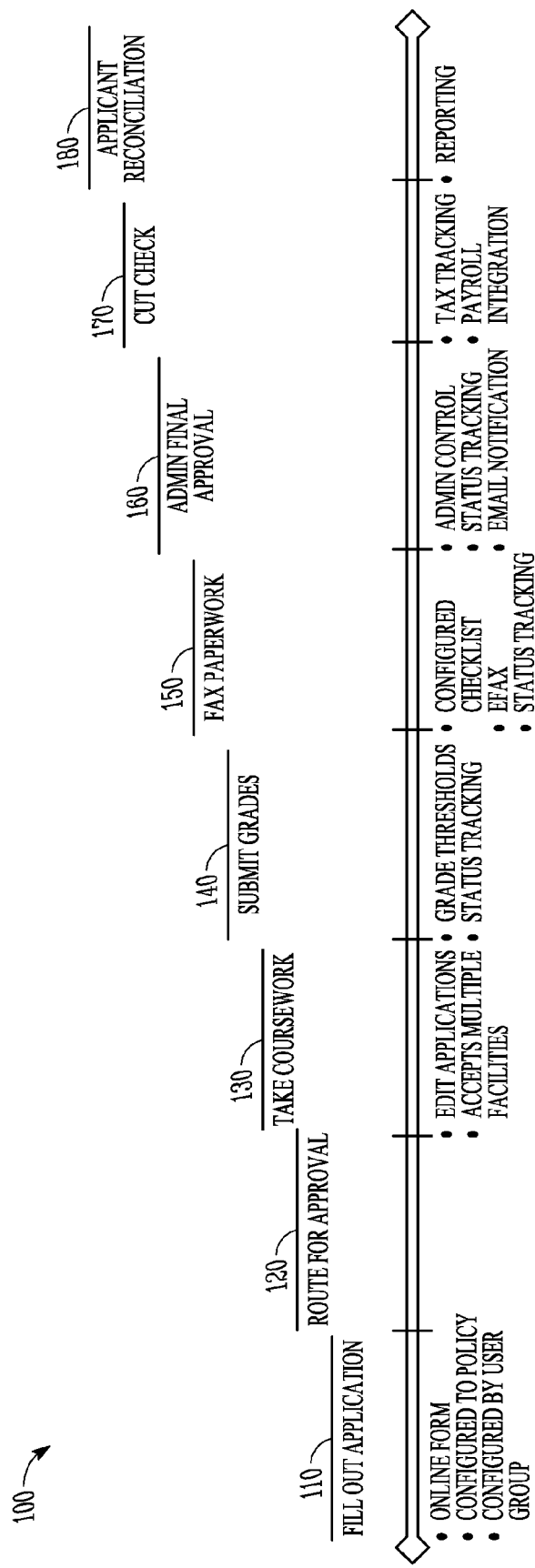
FIG. 1 is an illustration of an example embodiment of a system for reimbursement of tuition expenses.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

One or more embodiments relate to a system and method of a web-based tuition reimbursement tool that incorporate an interactive approval between an employee, the employee's manager, and the human resources department or a third-party administrator acting on behalf of the human resources department. The system and method can be implemented without the need for multiple manual transactions, rigid and lengthy online processes, cumbersome reporting, or expensive outsourcing. The system can be implemented in virtually any language so that the system can be used globally.

An administrator of an embodiment of the system and process has at his or her disposal an online "command center" that allows site customization and managing of individual applications. This command center can be considered an online tool for managing the submission of tuition applications, thereby helping to reduce time-wasting and energydraining aspects of a paper and fax process. An embodiment further includes integration with single-sign on functionality, customizable content on pages such as program information, employee acceptance terms and application steps, two-level manager approval with built-in workflow emails, quick access to standard reports, grade validation, final payment approval, and employee searches. One or more embodiments of the system can be considered an off-the-shelf tuition reimbursement software tool.

FIG. 1 illustrates a schematic 100 of a tuition reimbursement system and method. At 110, an on-line application is presented to an employee and filled out by the employee. This application form can be configured to suit the policies of the business organization through the use of the command center. The application form can also be configured differently for different groups within the business organization. For example, there can be different configurations for employees who are full time, employees who are part time, and employees who are at an executive level. After the application form is completed, the application form is systematically routed for approval using email notifications at 120. The approval can require one or both of the employee's manager and/or the human resources department. The approval or denial status is then transmitted back to the employee via email. At 130, the employee takes and completes the course or courses. At any time after an application has been submitted, including when the employee is enrolled in the courses, the employee can access the system to check the status and/or modify his or her application form. After the coursework is completed, the employee logs onto the system and submits the grades received for the courses at 140. The system at this point can initially check for grade thresholds, as the business organization may only reimburse an employee for a course if a certain grade (such as a "C" or higher) is received for that course. As described in further detail later, such a threshold can be customized for a particular business organization or a group within that business organization through the command center. After submitting the grades, an employee can again track the status of the application for payment of that tuition reimbursement. At 150, the completed information, a system generated coversheet including a bar code and the grade(s) for the completed course, is sent to the human resources department. This information can be sent via an eFax or emailed using scanned pdf files of the original proof of course outcomes/receipts. The bar code included on the coversheet that is part of the efax is systematically read and attached to the originally submitted electronic application record. At 160, there is final administration review, validation of submitted documentation via efax or pdf, and approval (or denial) of the application for tuition reimbursement. If the tuition reimbursement is approved, a check is cut at 170. The cutting of a check can be the result of integrating the tuition reimbursement system data with the payroll system of the business organization. Tax consequences, such as withholding, can be calculated by the system and handled by integration with the payroll system. After the check has been cut, the check can be delivered to the employee and appropriate reports can be generated at 180.

Figure 2:
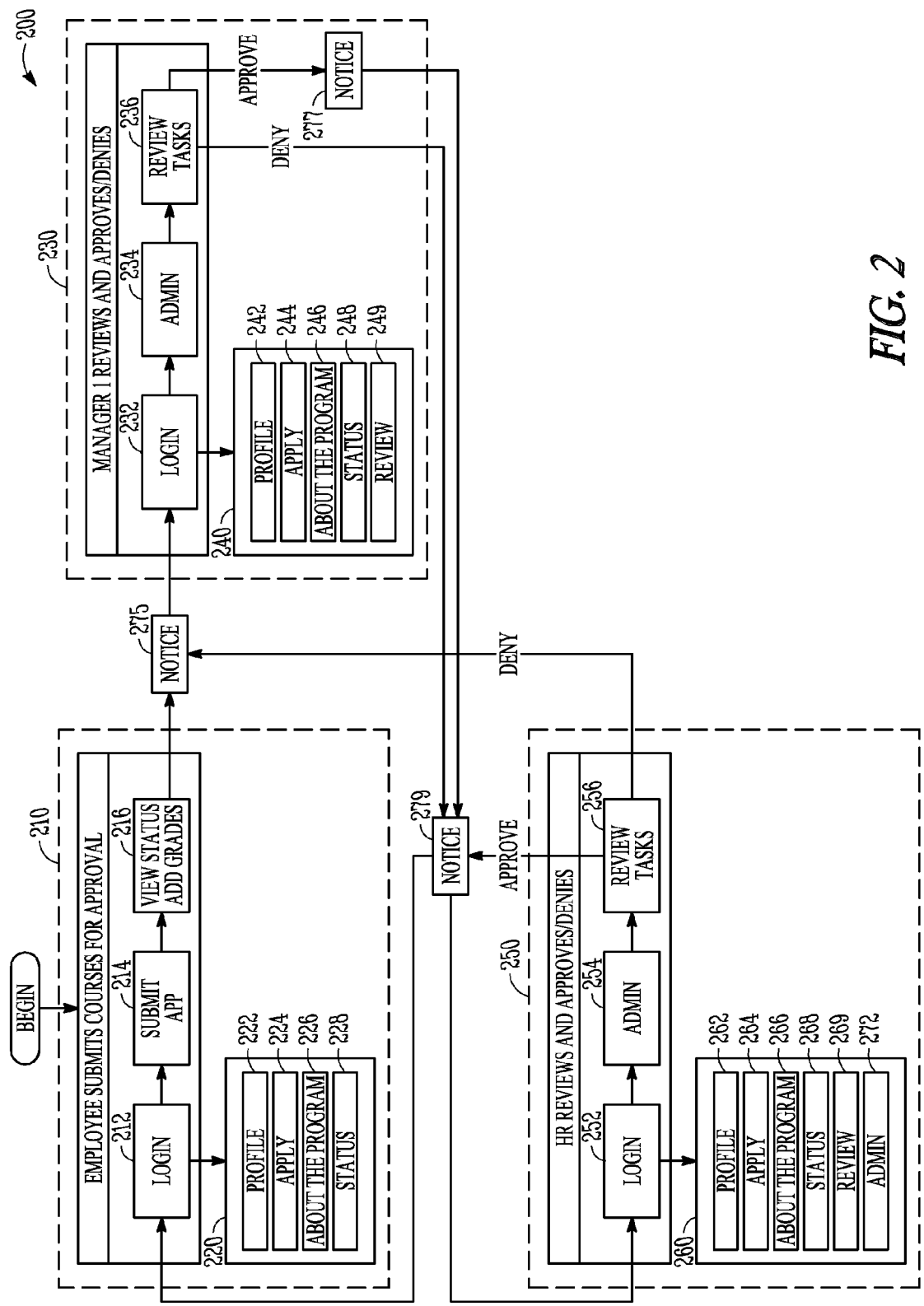
FIG. 2 is a block diagram of an example embodiment of a system for reimbursement of tuition expenses.

FIG. 2 illustrates a block diagram of an embodiment of a tuition reimbursement system 200. The system 200 can be divided into three main parts—an employee section 210, a manager section 230, and a human resources section 250. The employee module 210 permits an employee to get information about a tuition assistance program, submit an application for tuition reimbursement, and track the approval or denial status of a tuition reimbursement application. The employee module 210 includes a login module 212, a module 214 for receiving an application for tuition reimbursement from an employee, and a module 216 that permits an employee to view the status of his or her application for reimbursement and to submit grades for completed coursework. The employee module 210 also includes a sub-module 220 that includes a profile module 222, an application module 224, an information module 226, and a status module 228. The profile module 222 contains all required information about an employee typical of information maintained by any human resources department of a company such as address, marital status, birth date, number of dependents, etc. The profile module 222 can further include an employee's user id and password, and a preferred email address to be used in communications with the employee when using the tuition reimbursement system. The profile module 222 permits an employee to update and maintain this information. The application module 224 guides the employee through the process of filling out the course information, verifying the person (manager) responsible for application approval, agreeing to any required employee agreement, and submitting the application electronically. The application module 224 further permits an employee to submit an application for tuition reimbursement. FIG. 3 illustrates an example user interface 300 that can be invoked by an employee to submit an application for tuition reimbursement. The information module 226 contains information and instructions on the tuition reimbursement process, and the status module 228 provides to the employee a status of a submitted application. Using the status module 228, an employee can check on the status of an application, view an approved or denied status, and if the application is denied, the employee can see the reasons for the denial of the application. The status module 228 can also be used to view historical electronic records of previously processed applications. These electronic records can include application details and related documentation submitted via efax or emailed using the barcode to match the application and related documents.

Figure 4:
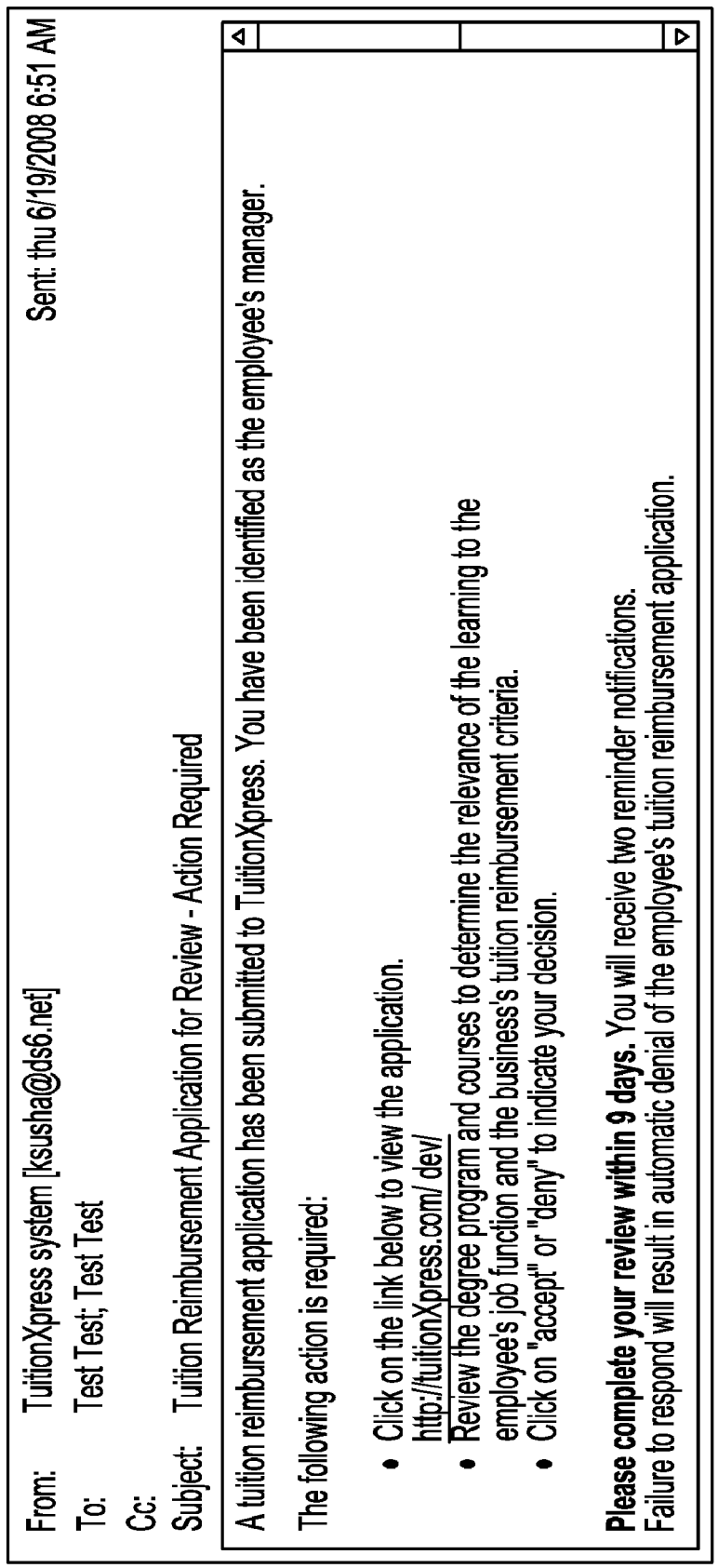
FIG. 4 is an example embodiment of an electronic message requesting an approval or disapproval from an employee manager or human resources manager of a request by an employee for tuition reimbursement.

The manager module 230 includes a login module 232, an administration module 234, and a review tasks module 236. The administration module 234 provides to a manager access to reporting if the manager has budget responsibilities. The review tasks module 236 provides to the manager a list of tuition reimbursement related tasks that are in need of the manager's attention and action such as pending applications for tuition reimbursement that are in need of his or her approval or denial. The manager module 230 also includes a sub-module 240 that includes a profile module 242, an application module 244, an information module 246, a status module 248, and a review module 249. The profile module 242, the application module 244, the information module 246, and the status module 248 provide similar functions to a manager as those modules provide to an employee as described above in relation to the employee module 210. The review module 249 permits a manager to review an employee's application for tuition reimbursement, and to approve or deny the application. In an embodiment, an email is triggered to the manager when his or her approval is needed. (See FIG. 4). The email can provide links and instructions to complete the approval process. The email further displays to the manager all information that is needed for the approval decision such as the employee name, course information, and reimbursement request amounts. In an embodiment, reasons for a denial are configured by the administrator, and the manager selects one or more reasons if the application is denied. In an embodiment, once the manager makes a decision, another email is triggered to the employee to inform the employee that the manager has made a decision.

The human resources module 250 includes a login module 252, an administrator module 254, and a review tasks module 256. The administrator module 254 provides multiple administrator functions to an administrator. In an embodiment, the administrator module 254 provides more functions to an administrator than its counterpart administrator module 234 to the employee's manager. The review tasks module 256, like the review tasks module 236, provides to the administrator a list of tuition reimbursement related tasks that are in need of the administrator's attention and action. The administrator module 250 also includes a sub-module 260 that includes a profile module 262, an application module 264, an information module 266, a status module 268, a review module 269, and an administrator module 272. The profile module 262, the application module 264, the information module 266, the status module 268, and the review module 269 provide similar functions to an administrator as those modules provide to the employee's manager as described above in relation to the manager module 230. The administrator module 272 provides to an administrator several powerful administrative tools and functions grouped into four major categories—managing users, managing content, managing applications, accessing reports, and managing data. Within these groups detailed functions include such tools as configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, and generating reports relating to the tuition reimbursement program.

Consequently, the human resources or administrator module 250 basically functions as an online "command center," and allows for site customization and management of individual applications. The site customization function allows an administrator to take an off the shelf embodiment of the system, and customize it with the look, feel, and logos of the administrator's company so that the system looks like an extension of the administrator's company. The administrator can add information to an "About the Program" page, which can also be referred to as an Information page. Additionally, application management tools allow the administrator to manage employee accounts, search employee records, lock and unlock accounts, reset passwords, upload accredited schools, override approved or denied tuition reimbursement applications, approve tuition reimbursements for payment, and validate grade and receipt documentation. The administrator can also generate reports of applications, approvals, and amounts to be paid. These reports can be categorized by month, area of study, department, business unit or facility, or many other categories. See FIG. 7.

Notice modules 275, 277, and 279 provide a means through which each module—the employee module 210, the manager module 230, and the human resources module 250—communicate with each other.

Figure 7:
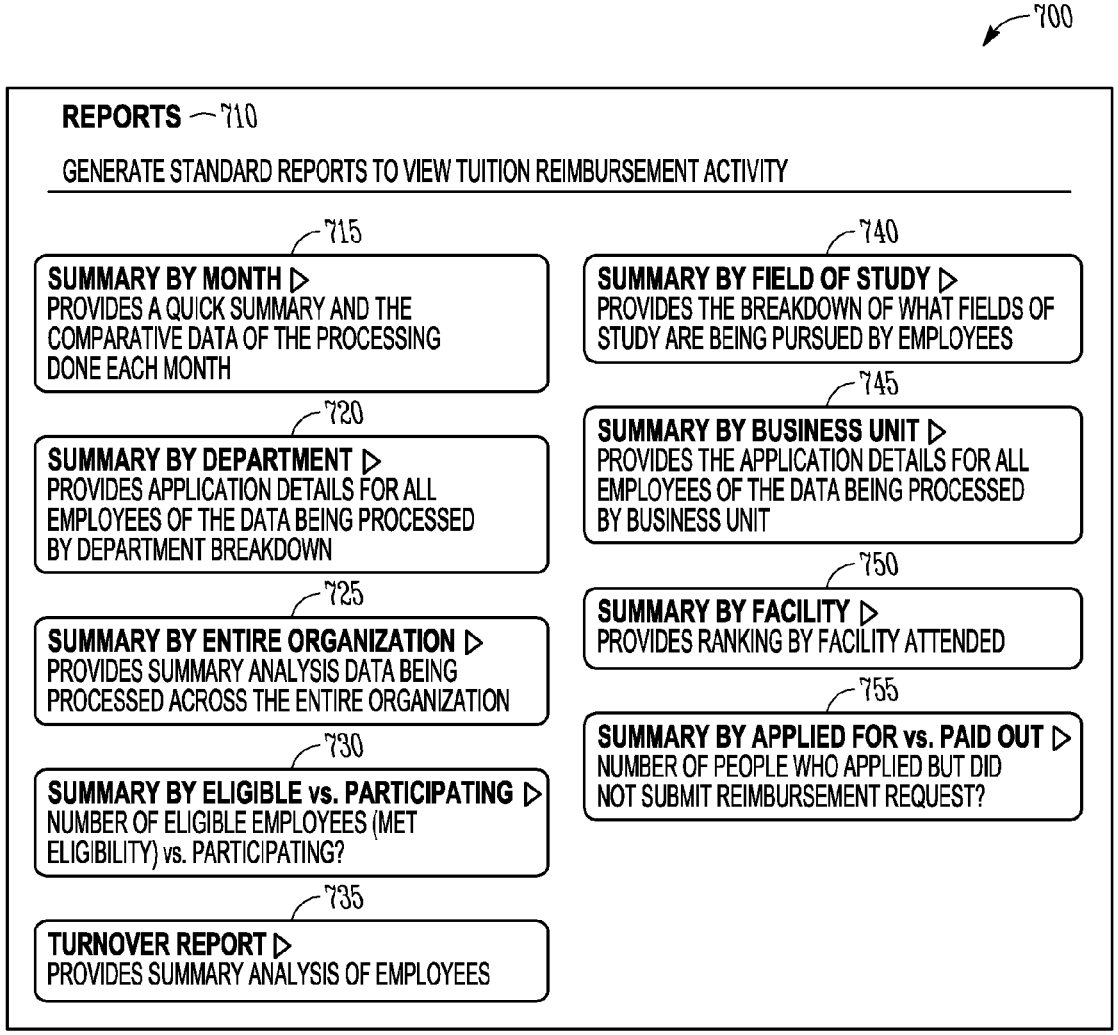
FIG. 7 is an example embodiment of a system administrator user interface for establishing report types to be generated by a system for reimbursement of tuition expenses.

FIGS. 5, 6, and 7 illustrate example user interfaces that can be part of the tuition reimbursement system command center. As noted above, the command center interface is used by an administrator to set up, customize, and implement a web site for the tuition reimbursement system. Specifically, FIG. 5 illustrates a user interface 500 that allows a system administrator to manage applications and customize sites. The interface 500 can include a Users section 510, an Applications section 520, a Reports section 530, a Content section 550, a System section 570, and a Data Feeds section 580. The Users section 510 permits an administrator to, for example, search for an employee application and review the details of the employee application (511), unlock and reset an employee's account (512), manage employee users such as assigning a manager to the employee, managing an employee's indicative information, or assigning a role to the employee (513), create user groups and assign reimbursement limits and eligibility rules for each group (514), and assign individuals or user groups access to reporting tools and add email addresses for employees (515).

The Applications section 520 permits an administrator to override approved or denied applications (521), and approve an application for tuition reimbursement and an amount for payment (522).

The Reports section 531 permits an administrator to invoke a plurality of functions. These functions include view all emails in the system (531), generate summary reports by a plurality of categories such as month (532), department (533), entire organization (534), field of study (535), business unit (536), facility (537), eligibility (538), participation (539), and whether the employee has already been reimbursed for a particular application (540). The Report section can also generate a turnover report 541, which reports on the employees who have left the business organization, and whether or not those employees took advantage of the tuition reimbursement program.

The Content section 550 permits an administrator to upload new facilities into the system (551), upload newly acceptable major areas of study into the system (552), modify accepted degree types (553), modify instructions in the system (554), modify reasons for denial (555), modify tax query information (556), modify the employee agreement relating to tuition reimbursement (557), update program contact information (558), modify program documentation (559), customize all emails generated by the system (560), edit text displayed in balloons (561), and modify a Frequently Asked Questions (FAQ) section (562).

The System section 570 permits an administrator to update general system settings (571) such as turning on/off what is reimbursable, assigning a system email address, assigning a 1-800 number for faxing documentation and many more functions, and to select a color scheme and logo display for the user interface (572). The Data Feeds section 580 permits an administrator to export data out of the tuition reimbursement system (581), import employee data into the system (582), and import archived data into the system (583).

FIG. 6 illustrates an example embodiment of an administrator's user interface 600 that permits an administrator to set system settings 610. The administrator can set the time period that locked accounts remain locked (611). The administrator can indicate the currency in which an employee will be reimbursed for tuition expenses (612). This is useful for multinational corporations that have employees all over the globe. The company name field 613 permits an administrator to display his or her company name on the system user interfaces, thereby giving the system the look and feel of one of its own company applications. The system permits the administrator to indicate the number of negative responses for taxable status at 614. This function refers to a series of questions, which are configurable by the administrator, that when negatively answered affects the tax status of the employee's tuition reimbursement. The checkboxes 615, 616, and 617 relate to tax questions, tuition fees, and text book costs. The Administrator can set a system name for email at 618, a system email at 619, and a site URL for the tuition reimbursement system at 620. The administrator can set whether or not a text explanation is allowed for denials at 621, whether courses can be taken pass/fail at 622, and a grade threshold for reimbursement at 623. The administrator can set an editor documentation link at 624. The editor documentation link permits a user/employee to perform editing functions in the system without having to know the web page language HTML. At 625, an administrator can set an automatic action and a time frame for such automatic action. That is, an application for tuition reimbursement can either be approved or denied after a certain time period if the employee's manager and/or the human resources department does not act on the application. At 626, the administrator is permitted to set an expiration time for a "forgot password" link such that, when a user forgets his or her password, he or she has a limited amount of time to recall the password when provided hints by the system. At 627, the administrator can indicate whether a prepaid amount needs to be displayed. A fax number for application supporting documentation can be supplied at 628, and a budget year can be chosen at 629. At 630, the administrator can set a limit for the number of classes that can be enrolled in or for which tuition reimbursement can be applied. At 631, the administrator can add a link to the IRS website. In other embodiments, the ability to add other links is available. At 632 and 633, the administrator is permitted to indicate time periods for submitting paper work and the submission of an application at two separate facilities. At checkbox 634, the administrator can set up the system so that an employee cannot change the application or grades after the application has been submitted with grades attached. At 635, the administrator can limit an employee to the number of applications for a time period, the line items per page at 636, indicate the course start date at 637, and at 638 allow an Ask a Question link in the FAQ section.

FIG. 7 illustrates an administrator user interface 700 that allows an administrator to customize reports 710. Specifically, the administrator can generate summaries by month (715), by department (720), by the entire business organization (725), by the number of eligible employees versus participating employees (730), by the filed of study (740), by business unit (745), by facility (750), and by a comparison of the number of employees who applied for tuition reimbursement versus the number of employees who received payment for their tuition (755) (an employee may initially apply for tuition reimbursement but may not receive such reimbursement because he or she did not finish the course or receive the threshold grade for the course). The administrator can also generate a turnover report at 735. As indicated above, a turnover report indicates the percentage of employees who have left the company who took advantage of the tuition reimbursement program while employed at the company. This allows a company to calculate a precise return on its investment relating to employee continuing education.

Figure 8:
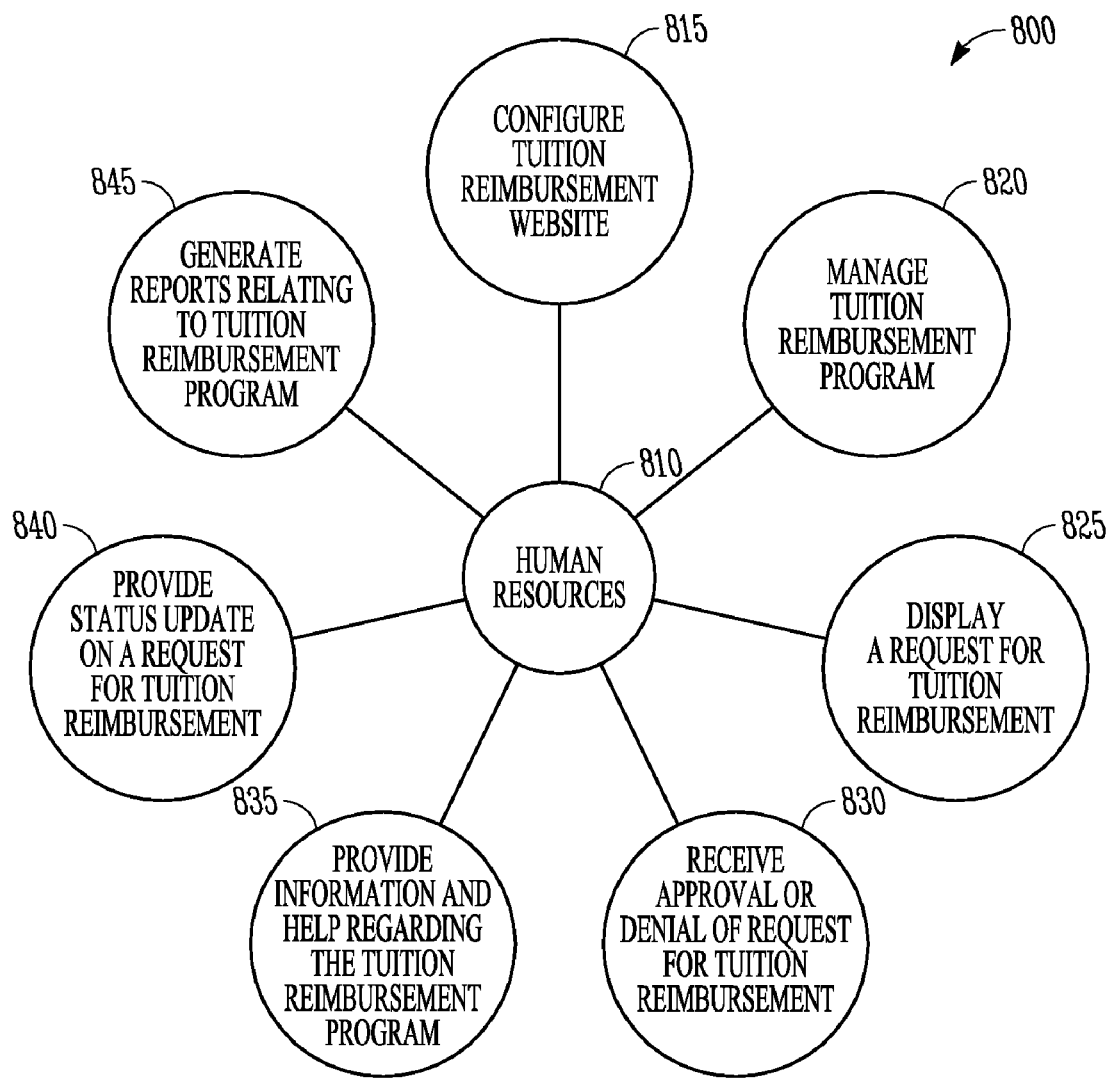
FIG. 8 is a schematic illustrating functionalities available to an administrator of a tuition reimbursement system.

FIG. 8 is a diagram 800 illustrating the functions of a processor configured for one or more human resource and administrative command functions of the tuition reimbursement system. The hub 810 indicates the human resources department. The functions available to the human resources department include the abilities to configure a tuition reimbursement website (815), manage a tuition reimbursement program from application submission through tuition reimbursement payment (820), display a request for tuition reimbursement (825), receive input regarding an approval or denial of the request for tuition reimbursement (830), provide information and help regarding the tuition reimbursement program (835), provide a status update on a request for tuition reimbursement (840), and generate reports relating to the tuition reimbursement program (845).

Figure 9:
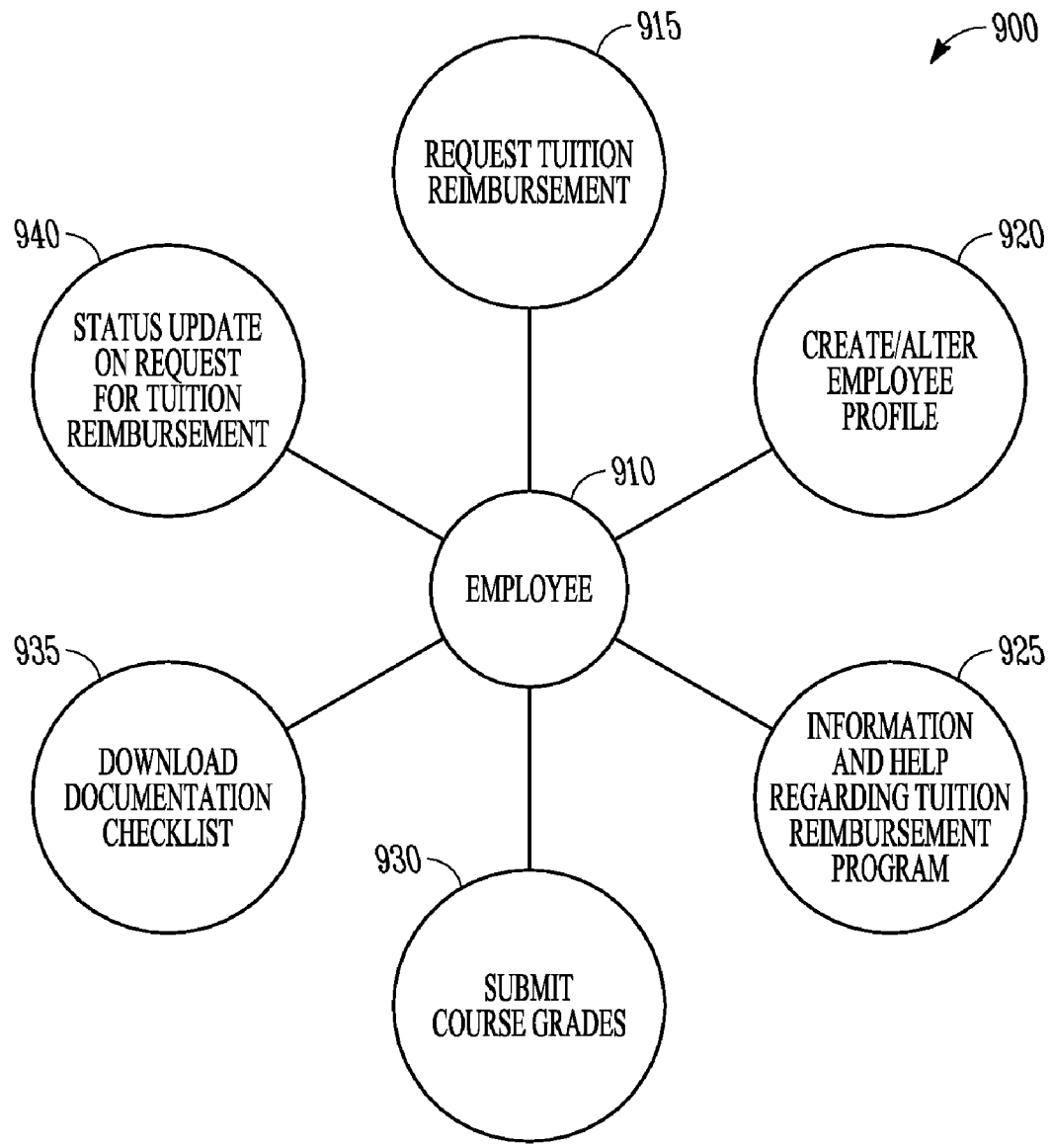
FIG. 9 is a schematic illustrating functionalities available to an employee in a tuition reimbursement system.

FIG. 9 is a diagram 900 illustrating the functions of a processor configured for one or more employee functions of the tuition reimbursement system. The hub 910 indicates the employee. The functions available to the employee include the abilities to request a tuition reimbursement (915), create and alter an employee profile (920), access information and help regarding the tuition reimbursement program (925), submit course grades into the tuition reimbursement system (930), download a documentation checklist (935), and request a status update on a request for tuition reimbursement (940).

Figure 10:
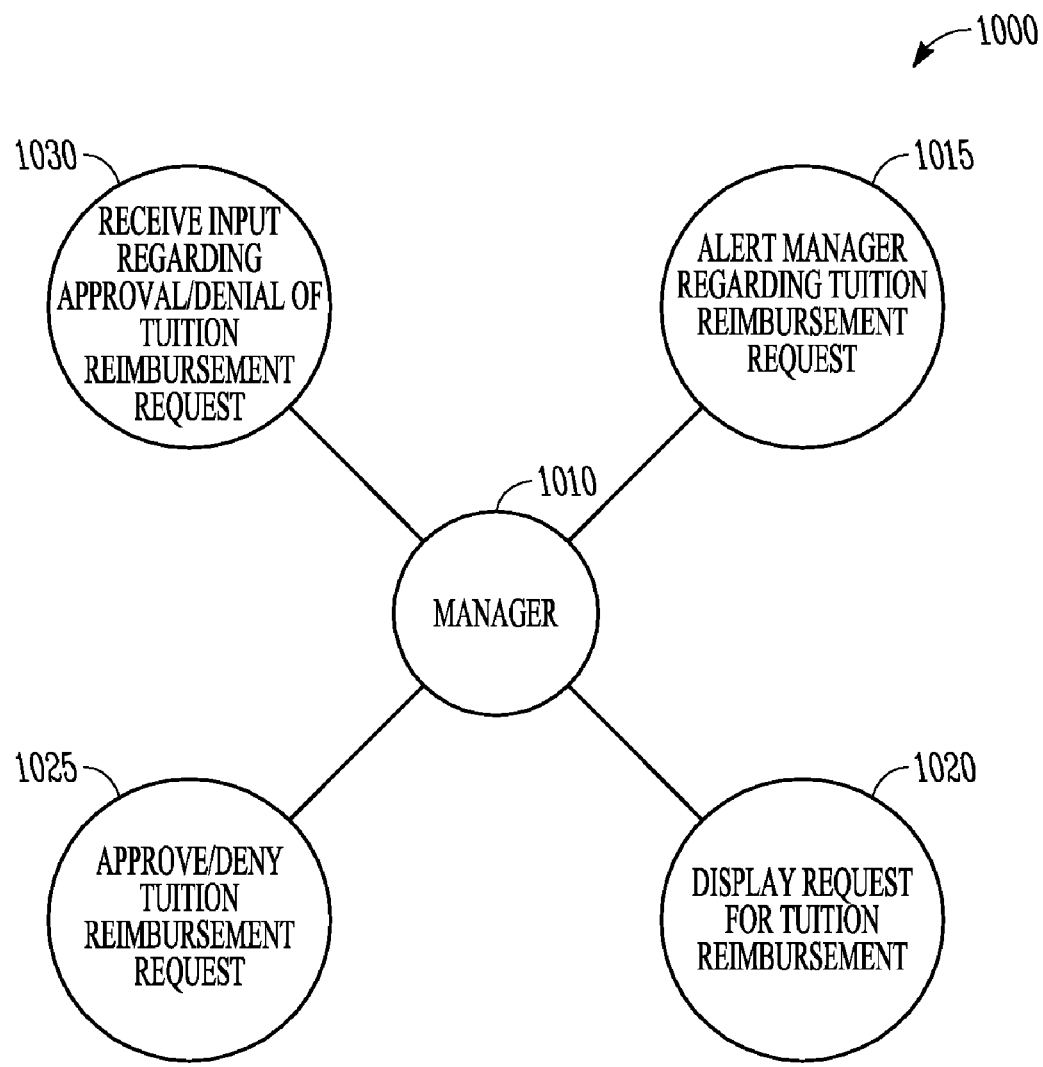
FIG. 10 is a schematic illustrating functionalities available to a manager in a tuition reimbursement system.

FIG. 10 is a diagram 1000 illustrating the functions of a processor configured for one or more managerial functions of the tuition reimbursement system. The hub 1010 indicates a manager of an employee. The functions available to the manager of the employee include the abilities to alert a manager that the request for tuition reimbursement has been submitted and requires approval (1015), display the request for tuition reimbursement (1020), approve or deny the tuition reimbursement request (1025), and provide input back to the employee regarding an approval or a denial of the request for tuition reimbursement (1030).

Figure 11:
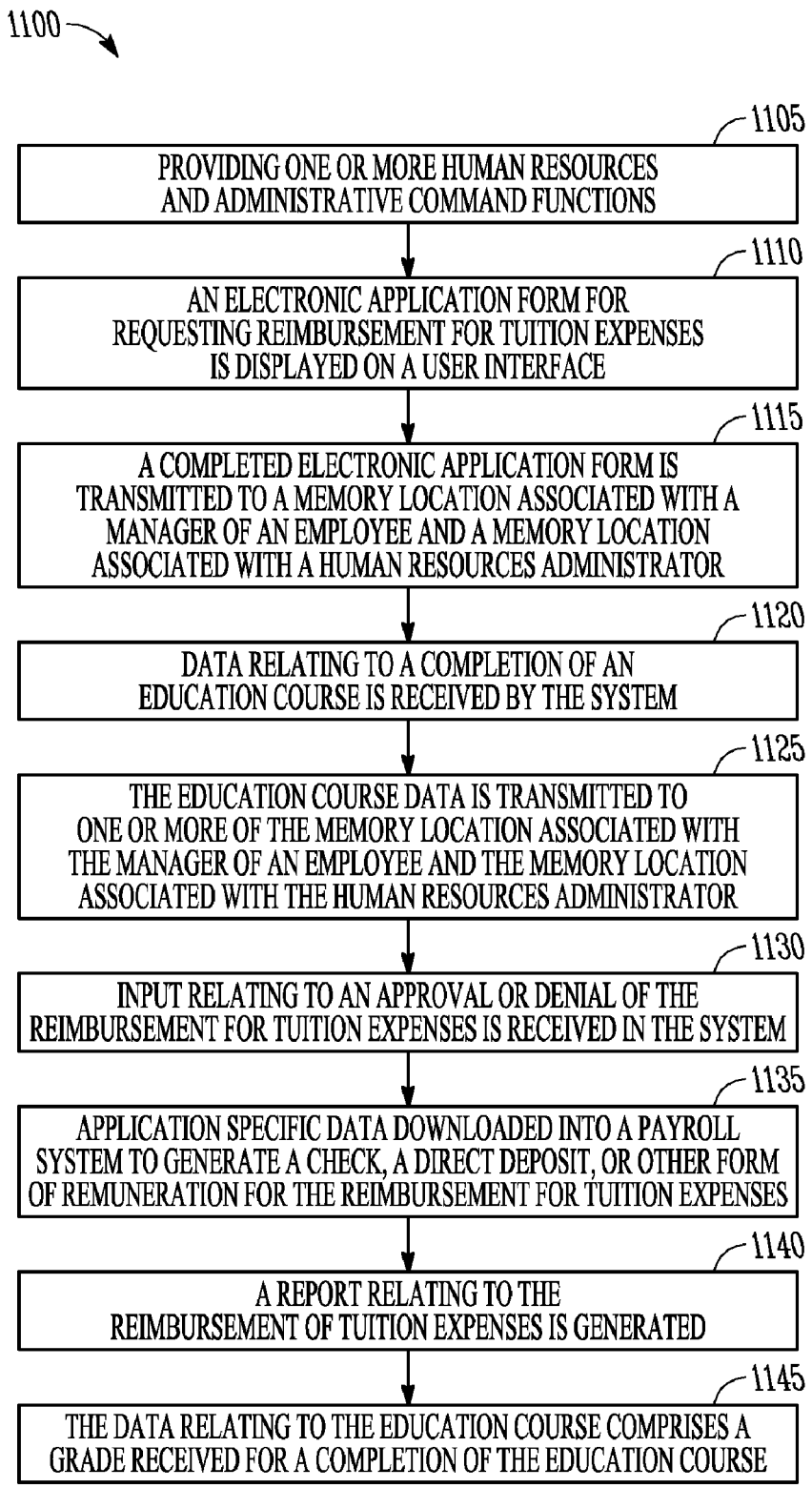
FIG. 11 is a flowchart of an example embodiment of a process to provide reimbursement for tuition expenses.

FIG. 11 is a flowchart of an example process 1100 for reimbursing tuition expenses. FIG. 11 includes a number of process blocks 1105-1145. Though arranged serially in the example of FIG. 11, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 11, a computerized process 1100 for tracking a tuition reimbursement program within a business organization includes at 1105 providing one or more human resources and administrative command functions. These human resources and administrative command functions can include configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, and generating reports relating to the tuition reimbursement program. At 1110, an electronic application form for requesting reimbursement for tuition expenses is displayed on a user interface. At 1115, a completed electronic application form is transmitted to a secure memory location associated with a manager of an employee and a memory location associated with a human resources administrator. At 1120, data submitted by the employee relating to a completion of an education course is received by the system. At 1125, the education course data is transmitted to one or more of the memory location associated with the manager of an employee and the memory location associated with the human resources administrator. At 1130, input relating to an approval or a denial of the reimbursement for tuition expenses is received in the system.

At 1135, application specific data that has passed all prior approval steps is downloaded into a payroll system to generate a check, a direct deposit, or other form of remuneration for the reimbursement for tuition expenses. At 1140, a report relating to the reimbursement of tuition expenses is generated. At 1145, the data relating to the education course comprises a grade received for a completion of the education course.

Figure 12:
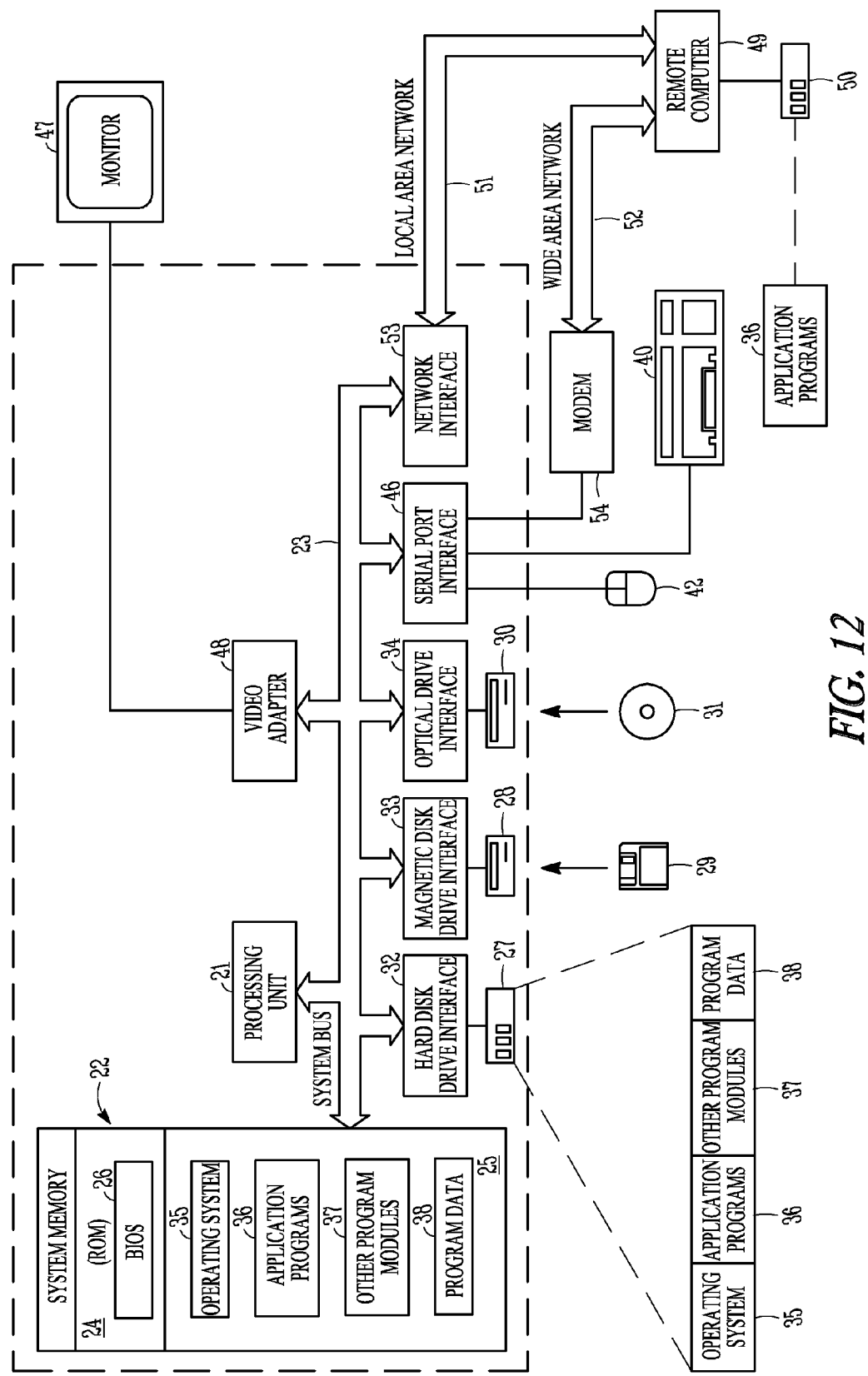
FIG. 12 is a block diagram of an example embodiment of a computer system upon which one or more of the embodiments of the present disclosure can execute.

FIG. 12 is an overview diagram of a hardware and operating environment in conjunction with which embodiments of the invention may be practiced. The description of FIG. 12 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 12, a hardware and operating environment is provided that is applicable to any of the servers and/or remote clients shown in the other Figures.

As shown in FIG. 12, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 12 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules can be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for a tuition reimbursement system has been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A system for tracking a tuition reimbursement program within a business organization comprising:
a human resource and administrative command functions computer processor configured for:
configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, collecting tuition reimbursement application details and related documentation, and generating reports relating to the tuition reimbursement program;
an employee functions computer processor configured for:
requesting tuition reimbursement, creating and altering an employee profile, submitting course grades into the system, and downloading a documentation checklist, and
a managerial functions computer processor configured for:
alerting a manager of an employee who requested tuition reimbursement that the request for tuition reimbursement has been submitted and requires approval by the manager, displaying the request for tuition reimbursement, and receiving input from the manager regarding an approval or a denial of the request for tuition reimbursement;
wherein the managing the tuition reimbursement program comprises functions including, creating a plurality of user groups as a function of eligibility for the tuition reimbursement program, overriding an application for tuition reimbursement by an administrator, modifying accredited school and class information, modifying degree types that are accepted by employer policy, modifying tax questions relating to tuition reimbursement based on employer policy, approving or denying payment requests for tuition reimbursement, enabling or disabling book or fee reimbursements, tax questions, and acceptable grade types, validating grade reports, and accepting tuition receipt documentation by attaching the tuition receipts to an application record.

2. The system of claim 1, wherein the generating reports relating to the tuition reimbursement program comprises one or more of a status update on the request for tuition reimbursement, the approval or denial of the request for tuition reimbursement, a tuition reimbursement history, and an amount to be reimbursed for a tuition expenditure.

3. The system of claim 1, wherein the human resource and administrative command functions computer processor is configured to report an amount to be reimbursed for tuition expenditures by one or more of a month, an area of study, a department, a business unit, or a facility.

4. The system of claim 1, wherein the human resource and administrative command functions computer processor is configured to implement a workflow email system among an employee, an employee manager, a human resources department, and a human resources manager.

5. The system of claim 1, wherein the managing the tuition reimbursement program ensures compliance with one or more statutes, regulations, and policies.

6. The system of claim 1, wherein the human resource and administrative command functions computer processor is further configured such that an employee cannot change the application or a course grade after the course grade has been submitted to the system.

7. The system of claim 1, wherein the managing the tuition reimbursement program comprises functions including managing employee accounts, searching employee records, securing employee accounts, resetting employee account passwords, and configuring a website color scheme and logo.

8. The system of claim 7, wherein the human resource and administrative command functions computer processor is configured to permit an administrator to configure the system by selecting one or more of the functions.

9. A computerized process for tracking a tuition reimbursement program within a business organization comprising:

providing by a processor human resources and administrative command functions including configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, and generating reports relating to the tuition reimbursement program;

displaying by the processor on a user interface an electronic application form for requesting reimbursement for tuition expenses;

transmitting, by the processor a completed electronic application form for tuition reimbursement from the processor to a memory location associated with a manager of an employee and a memory location associated with a human resources administrator;

receiving data at the processor relating to a completion of an education course; transmitting by the processor the education course data from the processor to one or more of the memory location associated with the manager of an employee and the memory location associated with the human resources administrator; and receiving input at the processor relating to an approval or a denial of the reimbursement for tuition expenses;

creating, by the processor, a plurality of user groups as a function of eligibility for the tuition reimbursement program;

overriding, by the processor, an application for tuition reimbursement by an administrator;

modifying, by the processor, accredited school and class information;

modifying, by the processor, degree types that are accepted by employer policy;

modifying, by the processor, tax questions relating to tuition reimbursement based on employer policy;

approving, by the processor, or denying payment requests for tuition reimbursement;

enabling or disabling, by the processor, book or fee reimbursements, tax questions, and acceptable grade types;

validating, by the processor, grade reports; and accepting, by the processor, tuition receipt documentation by attaching the tuition receipts to an application record.

10. The computerized process of claim 9, comprising downloading by the processor application specific data into a payroll system processor to generate a check, a direct deposit, or other form of remuneration for the reimbursement of tuition expenses.

11. A system for tracking a tuition reimbursement program within a business organization comprising:

a processor configured for providing human resources and administrative command functions including configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, and generating reports relating to the tuition reimbursement program;

a processor configured for displaying on a user interface an electronic application form for requesting reimbursement for tuition expenses;

a processor configured for transmitting a completed electronic application form for tuition reimbursement to a memory location associated with a manager of an employee and a memory location associated with a human resources administrator;

a processor configured for receiving data relating to a completion of an education course;

a processor configured for transmitting the data relating to a completion of an education course to one or more of the memory location associated with the manager of an employee and the memory location associated with the human resources administrator; and a processor configured for receiving input relating to an approval or a denial of the reimbursement for tuition expenses;

wherein the managing the tuition reimbursement program comprises functions including, creating a plurality of user groups as a function of eligibility for the tuition reimbursement program, overriding an application for tuition reimbursement by an administrator, modifying accredited school and class information, modifying degree types that are accepted by employer policy, modifying tax questions relating to tuition reimbursement based on employer policy, approving or denying payment requests for tuition reimbursement, enabling or disabling book or fee reimbursements, tax questions, and acceptable grade types, validating grade reports, and accepting tuition receipt documentation by attaching the tuition receipts to an application record.

12. The system of claim 11, comprising a processor configured for generating a check, a direct deposit, or other form of remuneration for the reimbursement of tuition expenses.

13. A system for tracking a tuition reimbursement program within a business organization comprising:

a human resource and administrative command functions computer processor configured for:

configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, and generating reports relating to the tuition reimbursement program;

an employee functions computer a processor configured for:

requesting tuition reimbursement, creating and altering an employee profile, and downloading a documentation checklist; and a managerial functions computer processor configured for:

alerting a manager that the request for tuition reimbursement has been submitted and requires approval, displaying the request for tuition reimbursement, and receiving input regarding an approval or a denial of the request for tuition reimbursement;

wherein the managing the tuition reimbursement program comprises functions including, creating a plurality of user groups as a function of eligibility for the tuition reimbursement program, overriding an application for tuition reimbursement by an administrator, modifying accredited school and class information, modifying degree types that are accepted by employer policy, modifying tax questions relating to tuition reimbursement based on employer policy, approving or denying payment requests for tuition reimbursement, enabling or disabling book or fee reimbursements, tax questions, and acceptable grade types, validating grade reports, and accepting tuition receipt documentation by attaching the tuition receipts to an application record.

14. A non-transitory computer readable storage medium comprising instructions that when executed by a processor execute a process comprising:

provtiding human resources and administrative command functions including configuring a website relating to the tuition reimbursement program, managing the tuition reimbursement program, displaying a request for tuition reimbursement, receiving input regarding an approval or denial of the request for tuition reimbursement, providing information and help regarding the tuition reimbursement program, providing a status update on a request for tuition reimbursement, and generating reports relating to the tuition reimbursement program;

displaying on a user interface an electronic application form for requesting reimbursement for tuition expenses;

transmitting a completed electronic application form from the processor to a memory location associated with a manager of an employee and a memory location associated with a human resources administrator;

receiving data at the processor relating to a completion of an education course;

transmitting the education course data from the processor to one or more of the memory location associated with the manager of an employee and the memory location associated with the human resources administrator; and receiving input at the processor relating to an approval or a denial of the reimbursement for tuition expenses;

wherein the managing the tuition reimbursement program comprises functions including, creating a plurality of user groups as a function of eligibility for the tuition reimbursement program, overriding an application for tuition reimbursement by an administrator, modifying accredited school and class information, modifying degree types that are accepted by employer policy, modifying tax questions relating to tuition reimbursement based on employer policy, approving or denying payment requests for tuition reimbursement, enabling or disabling book or fee reimbursements, tax questions, and acceptable grade types, validating grade reports, and accepting tuition receipt documentation by attaching the tuition receipts to an application record.

15. The non-transitory computer readable storage medium of claim 14, comprising instructions for downloading application specific data into a payroll system processor to generate a check, a direct deposit, or other form of remuneration for the reimbursement of tuition expenses.

* * * * *

UNITED STATES PATENT AND TRADEMARK OFFICE
CERTIFICATE OF CORRECTION

| | | |
|---|---|---|
| PATENT NO. | : 8,352,381 B2 | Page 1 of 1 |
| APPLICATION NO. | : 12/492811 | |
| DATED | : January 8, 2013 | |
| INVENTOR(S) | : Mary J. Betzold | |

It is certified that error appears in the above-identified patent and that said Letters Patent is hereby corrected as shown below:

On the Title Page, Item (56)

In column 1, under "Other Publications", line 3, delete "Tuition Express, Inc." and insert --tuitionXpress, Inc.--, therefor In column 1, under "Other Publications", line 4, delete "Tuition Express, Inc." and insert --tuitionXpress, Inc.--, therefor On page 2, in column 1, under "Other Publications", line 24, delete "pgs." and insert --pg.--, therefor On page 2, in column 2, under "Other Publications", line 27, delete "pgs." and insert --pg.--, therefor In the Claims In column 12, line 10, in Claim 1, delete "checklist," and insert --checklist;--, therefor In column 13, line 22, in Claim 9, after "course;", insert --¶--, therefor In column 14, line 46, in Claim 13, after "computer", delete "a", therefor Signed and Sealed this
Second Day of December, 2014

Michelle K. Lee
*Deputy Director of the United States Patent and Trademark Office*